(12) United States Patent
Ng et al.

(10) Patent No.: US 9,549,633 B2
(45) Date of Patent: Jan. 24, 2017

(54) SHAKER BOTTLE (71) Applicant: UMORO INC., Toronto (CA)

(72) Inventors: Joseph Hon-Kwong Ng, Toronto (CA); Justin Benjamin Rosete, Toronto (CA)

(73) Assignee: Umoro Inc.

( * ) Notice: Subject to any disclaimer, the term of this patent is extended or adjusted under 35 U.S.C. 154(b) by 18 days.

(21) Appl. No.: 14/431,584

(22) PCT Filed: Oct. 10, 2013

(86) PCT No.: PCT/CA2013/000854
§ 371 (c)(1),
(2) Date: Mar. 26, 2015

(87) PCT Pub. No.: WO2014/056079
PCT Pub. Date: Apr. 17, 2014

(65) Prior Publication Data
US 2015/0250349 A1      Sep. 10, 2015

Related U.S. Application Data (60) Provisional application No. 61/712,035, filed on Oct. 10, 2012.

(51) Int. Cl.
*A47J 31/40*      (2006.01)
*A47J 43/27*      (2006.01)

(52) U.S. Cl.
CPC ............... *A47J 31/404* (2013.01); *A47J 31/40* (2013.01); *A47J 43/27* (2013.01)

(58) Field of Classification Search
CPC .......... A47J 31/404; A47J 31/40; A47J 43/27; B65D 51/2864; B65D 51/2821; B65D 51/2835; B65D 81/3222; B65D 81/3211; Y10S 215/08
(Continued)

(56) References Cited

U.S. PATENT DOCUMENTS 1,750,334 A * 3/1930 Stern ................... A47J 43/27
                                                     220/506
2,592,485 A * 4/1952 Stair ................... A47J 43/27
                                                     220/568
(Continued)

FOREIGN PATENT DOCUMENTS

DE       202007013978 U1    11/2008

*Primary Examiner* — Anthony Stashick
*Assistant Examiner* — Ernesto Grano (57) ABSTRACT

A shaker bottle comprising an open top lower vessel for retaining a liquid volume, an upper member releasably engaging and closing the open top lower vessel; the upper member including a liquid passage inlet in a bottom surface thereof connected to a closable port on an exterior of the upper member allowing liquid in the lower vessel to pass through the inlet and the closable port when the closable port is open and the upper member is closing the lower vessel; the upper member including a storage chamber suitable for receiving a powder supplement; the storage chamber including a releasable bottom member forming a seal with the storage chamber separating the storage from the lower vessel when the releasable bottom member is in with the storage chamber; the bottom member when released from the storage chamber being received in the lower vessel with the storage chamber being open to the lower vessel.

9 Claims, 10 Drawing Sheets (58) Field of Classification Search
USPC .......................................................... 215/227
See application file for complete search history.

(56) References Cited

U.S. PATENT DOCUMENTS

| | | | | |
|---|---|---|---|---|
| 2,791,467 | A * | 5/1957 | Leshin | A47J 43/27 215/6 |
| 2,815,981 | A * | 12/1957 | Nonnamaker | A47G 21/18 215/388 |
| 3,333,738 | A * | 8/1967 | Goss | A47J 43/27 141/18 |
| 3,341,184 | A * | 9/1967 | Merrill | A47J 43/27 215/371 |
| 3,349,966 | A * | 10/1967 | Schwartzman | B65D 47/248 206/222 |
| 3,677,524 | A * | 7/1972 | Douglas | A47J 43/27 215/13.1 |
| 3,820,692 | A * | 6/1974 | Swett et al. | B65D 47/0895 222/547 |
| 4,408,690 | A * | 10/1983 | Ferrero | B01F 13/002 206/219 |
| 4,638,927 | A * | 1/1987 | Morane | B65D 51/2821 206/222 |
| 5,085,330 | A * | 2/1992 | Paulin | A47G 19/2272 215/387 |
| 5,419,429 | A * | 5/1995 | Zimmerman | A47J 43/27 206/222 |
| 6,022,134 | A * | 2/2000 | Andrews | B01F 13/002 206/221 |
| 6,070,519 | A * | 6/2000 | Sham | A47J 19/02 99/348 |
| 6,257,428 | B1 * | 7/2001 | Caola | A61J 1/2093 206/219 |
| 6,616,319 | B2 * | 9/2003 | Renz | A61J 9/00 215/11.1 |
| 6,945,393 | B2 * | 9/2005 | Cho | B65D 51/24 206/219 |
| D510,678 | S * | 10/2005 | Krasne | D7/376 |
| 6,976,578 | B1 * | 12/2005 | Kenihan | B65D 51/2835 206/219 |
| D565,353 | S * | 4/2008 | Roth | D7/510 |
| 7,568,576 | B2 * | 8/2009 | Sweeney, Jr. | B65D 51/2864 206/219 |
| 8,205,542 | B2 * | 6/2012 | Gilbert | A47J 31/20 99/284 |
| 8,365,941 | B2 * | 2/2013 | Mayer | A45F 3/18 206/217 |
| 8,485,359 | B2 * | 7/2013 | Anderson | B65D 51/2807 206/219 |
| 8,777,044 | B1 * | 7/2014 | Raymus | A47G 19/2272 215/12.1 |
| 8,857,665 | B2 * | 10/2014 | Owoc | B65D 23/00 206/219 |
| 9,067,716 | B2 * | 6/2015 | Cronin | B65D 51/2864 |
| 9,107,541 | B2 * | 8/2015 | Bodum | A47J 31/00 |
| 2004/0112770 | A1 * | 6/2004 | Oswald | B65D 51/2885 206/219 |
| 2006/0255035 | A1 * | 11/2006 | Lin | A47J 43/27 220/212 |
| 2007/0056447 | A1 * | 3/2007 | Swartz | A47G 19/2205 99/287 |
| 2007/0215496 | A1 * | 9/2007 | Scarborough | B65D 81/3222 206/222 |
| 2008/0078200 | A1 * | 4/2008 | Roth | A47J 36/2416 62/457.4 |
| 2008/0259723 | A1 * | 10/2008 | Rhodes | A47J 43/1018 366/247 |
| 2008/0286438 | A1 * | 11/2008 | Newell | B65D 51/2814 426/665 |
| 2010/0302897 | A1 * | 12/2010 | George | A47J 43/1025 366/130 |
| 2010/0315897 | A1 * | 12/2010 | Renna | A47J 43/27 366/130 |
| 2012/0217178 | A1 * | 8/2012 | Rohr | B65D 41/04 206/219 |
| 2013/0279287 | A1 * | 10/2013 | Cerasani | B65D 47/0885 366/130 |
| 2014/0233344 | A1 * | 8/2014 | Aliberti | A47J 43/27 366/130 |
| 2015/0036455 | A1 * | 2/2015 | Bennett | A47J 43/27 366/184 |
| 2015/0050405 | A1 * | 2/2015 | Trager | B65D 81/3211 426/519 |
| 2015/0114994 | A1 * | 4/2015 | Matteri | A47G 19/2272 366/130 |

* cited by examiner

SHAKER BOTTLE

CROSS REFERENCE TO RELATED APPLICATIONS

The present application claims priority of Provisional Application Ser. No. 61/712,035, filed Oct. 10, 2012, which is incorporated herein by reference.

FIELD OF THE INVENTION

The invention related to a shaker bottle for storing and selectively dispensing stored supplement material and more specifically the invention relates to a shaker bottle that, before mixing of the stored supplement, can function as a conventional water bottle.

BACKGROUND OF THE INVENTION

Many powdered supplements are available to be added to water or another liquid and have particular popularity with athletes and exercise programs. Such powdered supplements include, but are not limited to meal replacement powders, nutritional additives and protein supplements.

In the fitness community, athletes use protein supplements to increase performance and/or to help build muscle. These supplements typically come as powdered additives to be mixed with water before consumption. Many of these supplements are recommended to be taken after a workout. It is recommended that the protein supplements not be mixed in advance of consumption as the protein can denature in the water over time. As a result, many athletes bring a single portion of the powdered supplement with them to the gym and add it to water in a water bottle after their workout. If a powdered supplement is added to a traditional water bottle, shaking of the water bottle does not necessarily remove all the clumps of powder and does not result in a smooth textured drink.

Some specialty bottles for mixing protein shakes contain a wire whisk-like ball within the bottle. The whisk-like ball helps to mix the powdered supplement with the liquid in the bottle. To use this style of bottle, a user adds a liquid and supplement powder to the bottle, closes the bottle and shakes the contents. When the bottle is shaken, the wire whisk-like ball acts as an agitator to help dispense the clumped supplement. These specialty bottles do not provide an internal storage compartment for the powdered supplement. If a user would like to use the bottle for an alternate purpose, such as a water bottle prior to adding the protein powder, the powdered supplement must be separately stored. An example of this type of structure is shown in U.S. Pat. No. 6,379,032.

It is known in a baby bottle having a nipple outlet at the top thereof to include an integrated chamber under the lid of a bottle for storage of powdered supplements. The user adds water to the bottle and stores powdered supplement in the integrated chamber of the lid. The lid is then typically screwed on the bottle. When the user wishes to prepare the beverage, the powder in the compartment is released and falls into the bottom vessel. This release of the powder introduces the powder into the liquid in the bottom vessel. The bottle is shaken to provide mixing of the powder and the liquid.

With this baby bottle, the powder compartment blocks the opening in the lid used to receive the contents. The fluid must flow through the compartment to exit through the lid. Thus, the baby bottle cannot be used as a water bottle prior to the mixing of the powdered supplement. Additionally the releasable bottom of the powder compartment is substantially flat and is not optimized for agitation.

Another style of bottle includes a series of sealable compartments which are temporarily stored in the bottom vessel. The compartments are approximately half the volume of the bottom vessel. The bottle design allows for water to flow from the bottom vessel and through a passage in the lid for consumption prior to the addition of the powdered supplements. To add the supplement, the user removes the lid, extracts the compartments and pours the contents of at least one compartment into the bottom vessel. Liquid is then added. The compartments are removed from the bottle when a drink is prepared. This design requires the removal of the lid and removal of the compartment to add the supplement to the liquid contained within. This is undesirable as many users do not wish to contaminate the supplement or the other compartments with any dirt on their hands.

There is a need for a bottle with an internal powdered supplement compartment in isolation from liquid contained in the bottle which can be released without need to open the bottle or contaminate the interior of the bottle. There is a further need for such a bottle to be additionally used as a water bottle prior to the addition of the supplement.

SUMMARY OF THE INVENTION

A shaker bottle according to the present invention comprises an open top lower vessel for retaining a liquid volume and a lid assembly releasably engaging and closing said open top lower vessel. The lid assembly includes a liquid passage inlet in a bottom surface thereof connected to a closable port on an exterior of said lid assembly allowing liquid in the lower vessel to pass through the inlet and said closable port when the closable port is open and the lid assembly is closing the lower vessel. The lid assembly includes a storage chamber suitable for receiving a powder supplement. The storage chamber includes a releasable bottom member forming a seal with the storage chamber separating the storage chamber from the lower vessel when the releasable bottom member is in engagement with the storage chamber. The bottom member, when released from said storage chamber, is received in the lower vessel with any contents of the storage chamber being open the lower vessel.

In an aspect of the invention, the shaker bottle includes a releasable actuator for said releasable bottom member, wherein the releasable actuator is accessible on an exterior surface of the upper member.

In a preferred aspect of the invention, the bottom member of the shaker bottle is shaped to promote mixing when released from said upper member and displaced in said lower vessel.

In yet a further aspect of the invention, the bottom member includes upwardly projecting mixing vanes positioned within the storage chamber when the bottom member is in engagement with the storage chamber.

In yet another aspect of the invention, the bottom member includes downwardly projecting mixing vanes.

In a further aspect of the invention, the storage chamber includes a circular bottom peripheral edge for engagement with said bottom member, and said upwardly and downwardly projecting mixing vanes are curved to collectively form part of a sphere.

In yet a further aspect of the invention, the releasable actuator is a spring biased actuator having spring fingers engaging and retaining a retaining flange of the bottom member. The spring biased actuator, when actuated, moves the spring fingers from a position in engagement with the bottom member to a release position where the bottom member separates from said storage chamber and allows the release of the bottom member.

In yet a further aspect of the invention, the spring biased actuator is a push actuator, which when pressed, moves the spring fingers and displaces said bottom member to assist the release thereof.

In another aspect of the invention, the push actuator extends downwardly through the storage chamber and terminates within the storage chamber.

In yet another aspect of the invention, the retaining flange is upwardly offset and located above a midpoint of the bottom member when in engagement with the storage chamber.

In yet another aspect of the invention, the storage chamber is closed at an upper portion and includes a downwardly extending tube passing through and sealed with the storage chamber with an open end within the storage chamber. The actuator passes through the downwardly extending tube.

In yet a further aspect of the invention, the shaker bottle includes a plug for releasable sealing of the outlet port. The plug is retained on a strap secured to the upper member.

IN THE DRAWINGS

Preferred embodiments of the present invention are illustrated in the attached drawings in which.

DETAILED DESCRIPTION

Figure 1:
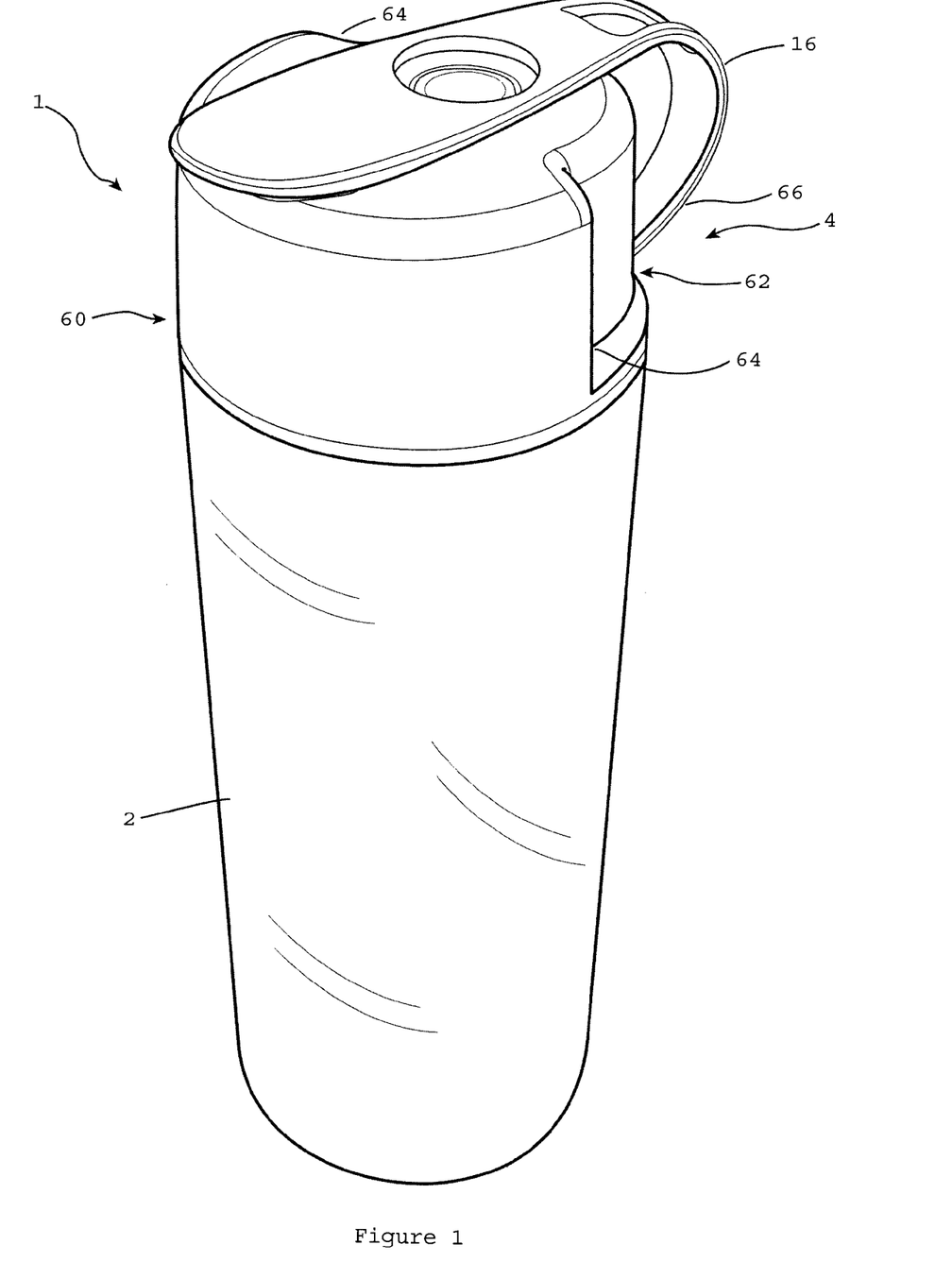
FIG. 1 is a perspective view of the assembled shaker bottle.

FIG. 1 shows a shaker bottle 1 comprising a lower containment vessel 2 for retaining a liquid volume, and a lid assembly 4 for releasably engaging and closing the lower containment vessel 2. The lower containment vessel 2 has an open top configured to releasably engage the lid assembly 4 in any suitable manner including screw threads and plug type interference fits. In a preferred embodiment, the lid assembly 4 contains external screw threads 6 (shown in FIG. 2) which engage inwardly projecting screw threads (not shown) of the lower containment vessel 2, that form a leak resistant seal. Optionally, an O-ring can be fitted above the external screw threads 6 of the lid assembly 4 and below a lip 7 on the lid assembly 4 to provide additional sealing between the lid assembly 4 and the lower containment vessel 2 as shown in FIG. 3.

Figure 3:
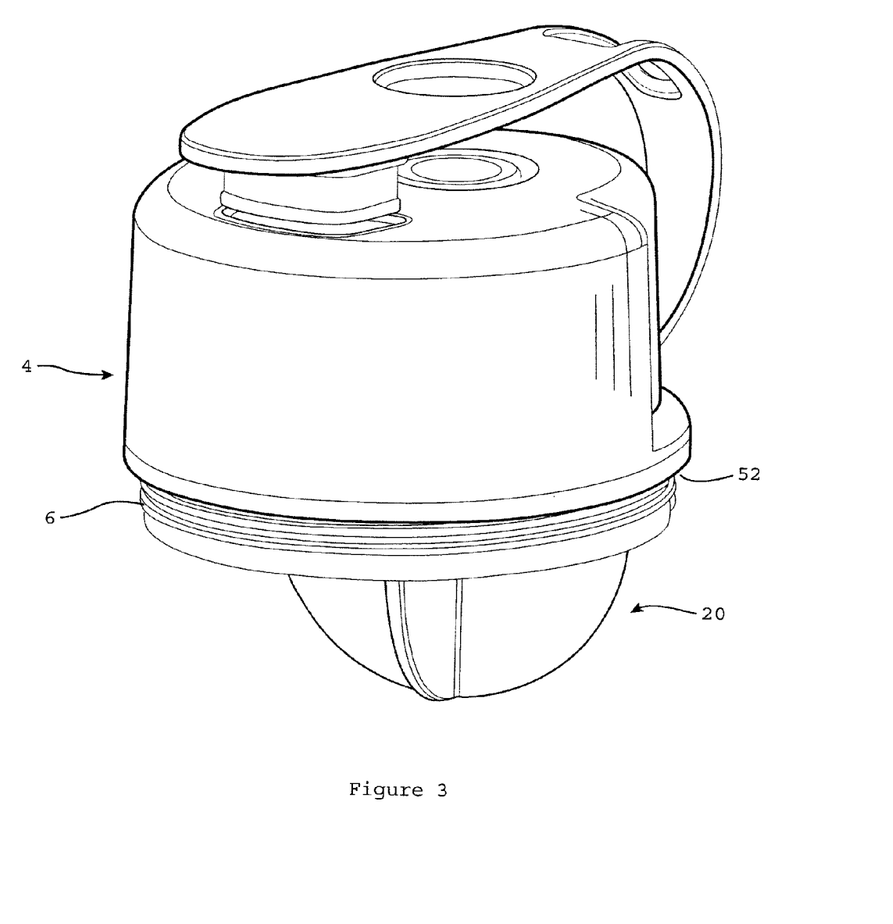
FIG. 3 is a perspective view of the lid assembly of the shaker bottle.
Figure 5:
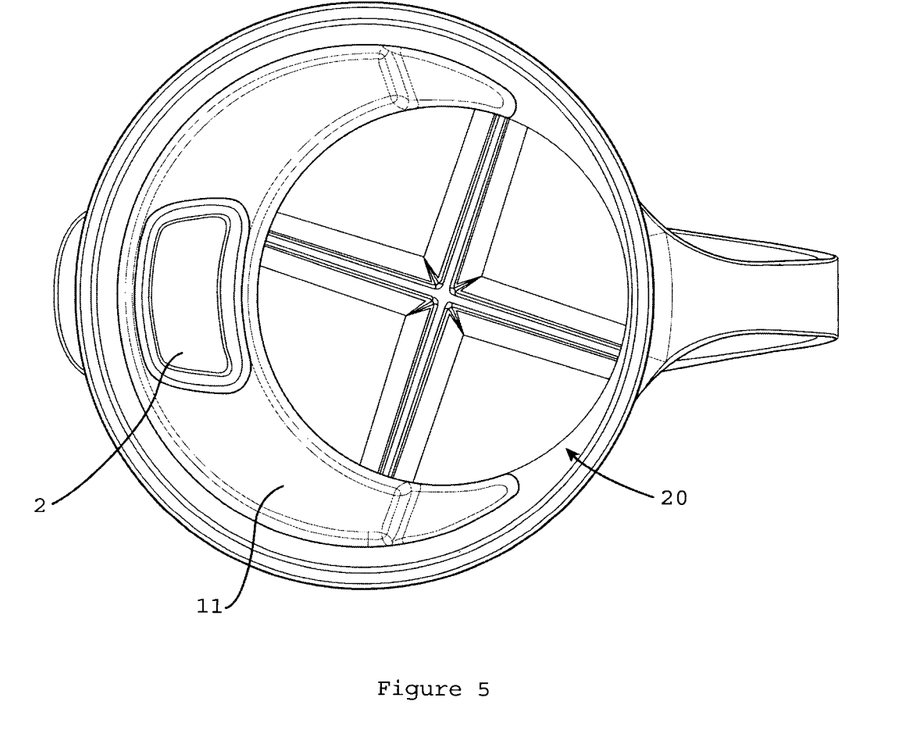
FIG. 5 is a bottom view of the lid assembly of the shaker bottle.

The lid assembly 4 includes a liquid passage inlet 11 that directly connects the lower containment vessel 2 and the port 12 on the upper surface of the lid assembly 4 (see FIG. 3). Any liquid contained in the lower vessel 2 can pass through the liquid passage inlet 11 and the port 12 (shown in FIG. 5). The lid assembly 4 has a plug closing member 14 for sealing the port 12 and preventing the passage of a liquid contained in the lower vessel 2 from exiting through the port 12 when the plug closing member 14 is received in the port 12. Preferably, the plug closing member 14 is coupled to the lid assembly via the plug strap 16. This design allows the plug closing member 14 to remain connected to the lid assembly 4 when port 12 is open. The plug closing member 14 preferably has a friction fit sized to engage the inner surface of the port 12. In particular, the plug closing member 14 is undercut to provide a tight fit between the plug closing member 14 and the port 12. This design allows for strong engagement of the plug closing member 14 and the port 12 such that the bottle can be carried by the plug strap 16. Alternate plug arrangements or other closing caps can be used.

Figure 2:
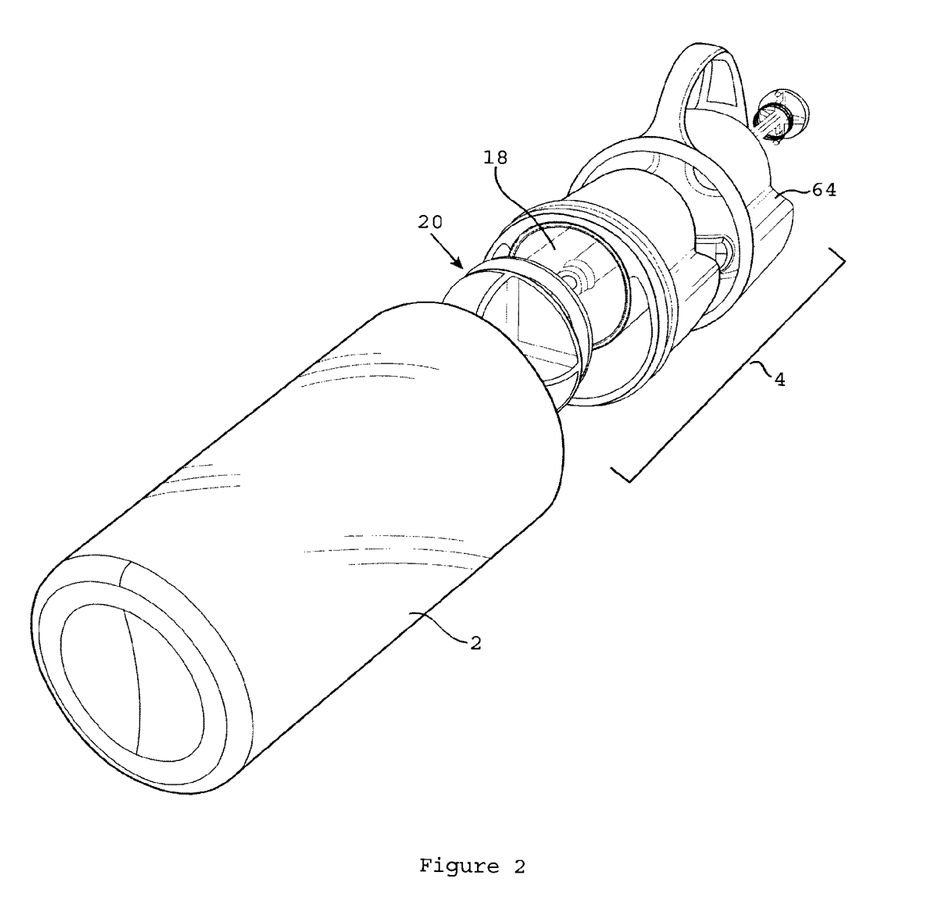
FIG. 2 is an exploded perspective view of the shaker bottle.
Figure 4:
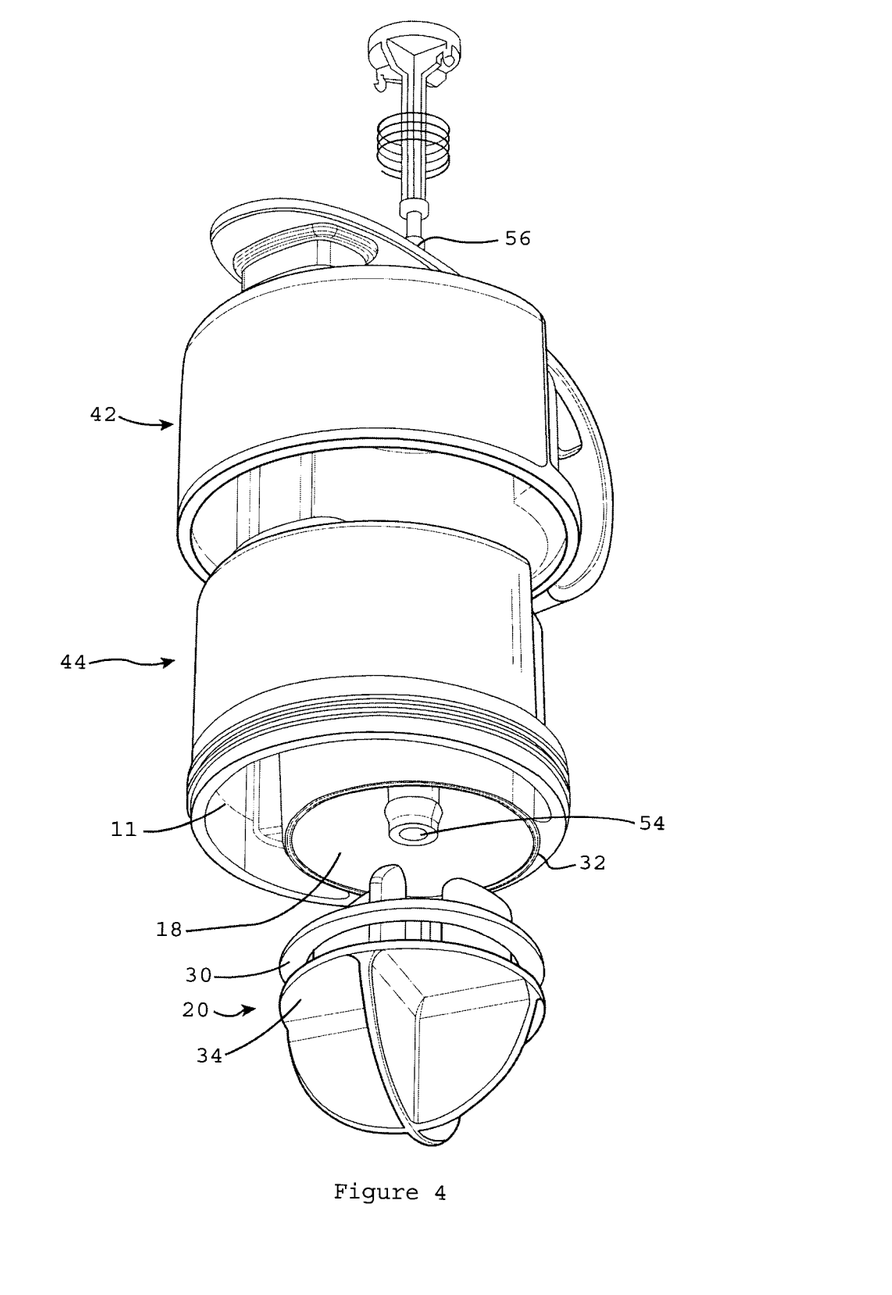
FIG. 4 is an exploded perspective view of a lid assembly.

With reference to FIGS. 2 and 4, the underside of the lid assembly includes a downwardly opening storage compartment 18 closed by a releasable bottom member 20. The downwardly opening storage compartment 18 accommodates storage of a drink additive, for example a powdered supplement. The downwardly opening storage compartment 18 is located in an offset position adjacent a side wall of the lid assembly 4 to leave a vertical space for the inlet passage 11 and port 12 to one side of the storage compartment. This allows the user to drink any liquid in the lower containment vessel prior to the addition of the supplement. For example the user can initially fill the lower containment vessel with water and replace it one or more times before using the liquid for receiving the stored supplement. Each time the lid assembly with the supplements is removed and water added to the lower containment vessel.

The bottom portion of the downwardly opening storage compartment 18 is closed using the releasable bottom member 20. The releasable bottom member 20 is configured to be coupled to the compartment 18 and when engaged, provides a closed barrier between the interior of the storage compartment 18 and the liquid in the lower containment vessel 2. A user places the drink additive within the downwardly opening storage compartment 18 and then releasably secures the bottom member 20 on the center post 26 of the downwardly opening storage compartment 18 to provide a liquid tight barrier between the compartment 18 and the lower containment vessel 2. Although the compartment could be any suitable size, it is preferred that it is sized to contain 1-3 scoops of protein powder. Typically the volume is in the order of 70 to 140 cc and preferably about 110 cc although other sizes can be provided.

Figure 6:
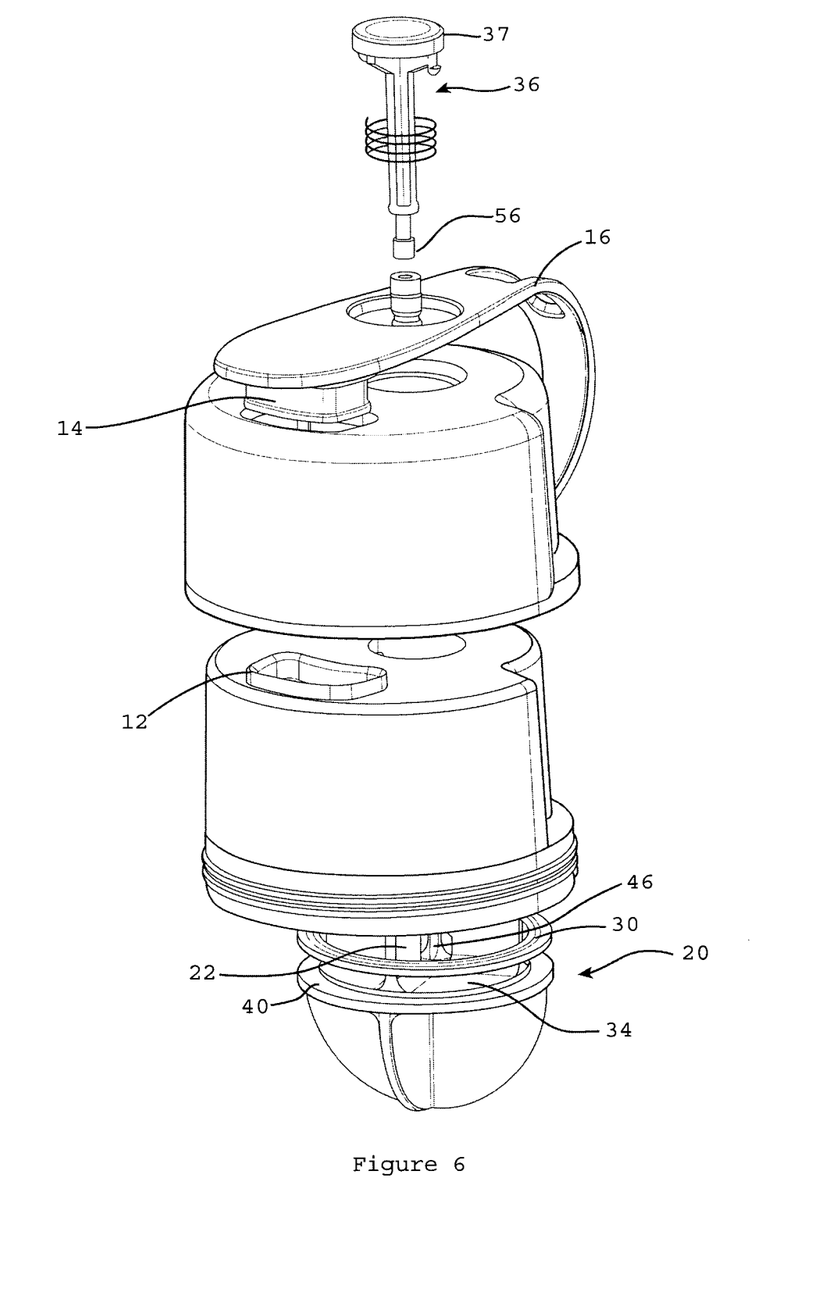
FIG. 6 is an exploded perspective view of the lid assembly.
Figure 7:
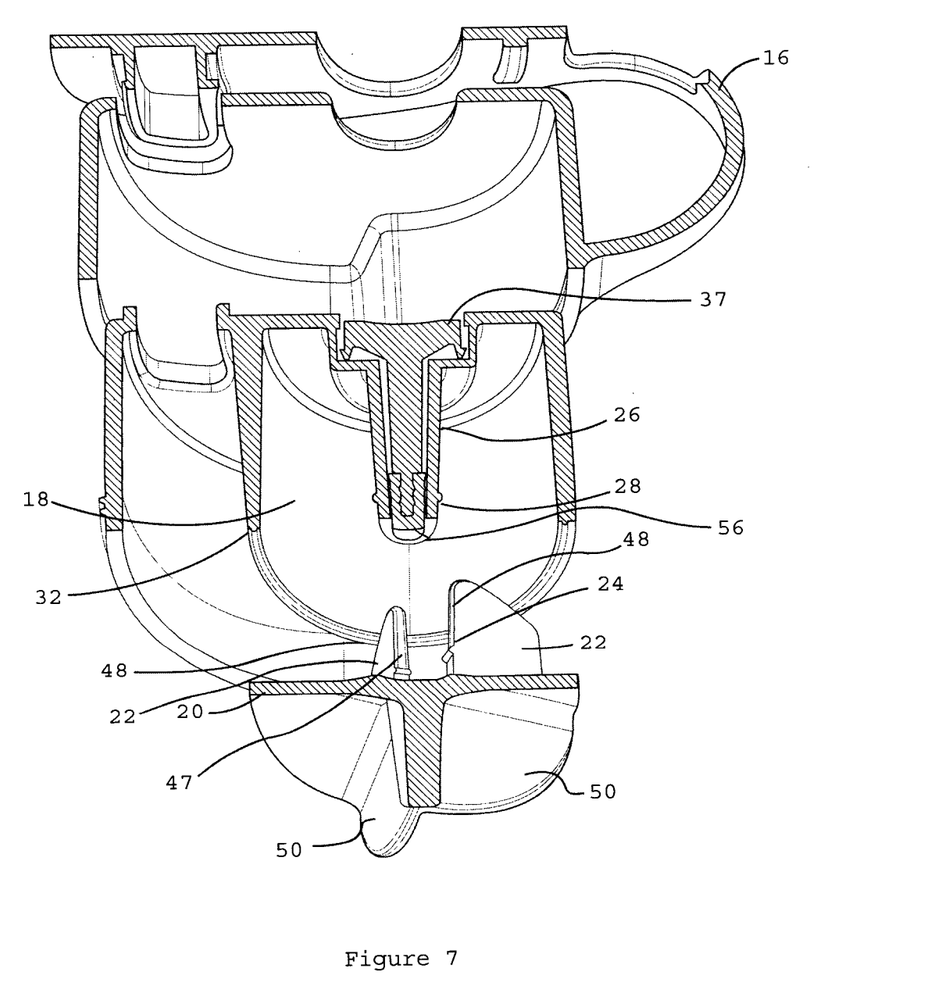
FIG. 7 is a vertical sectional view through the lid assembly.
Figure 8:
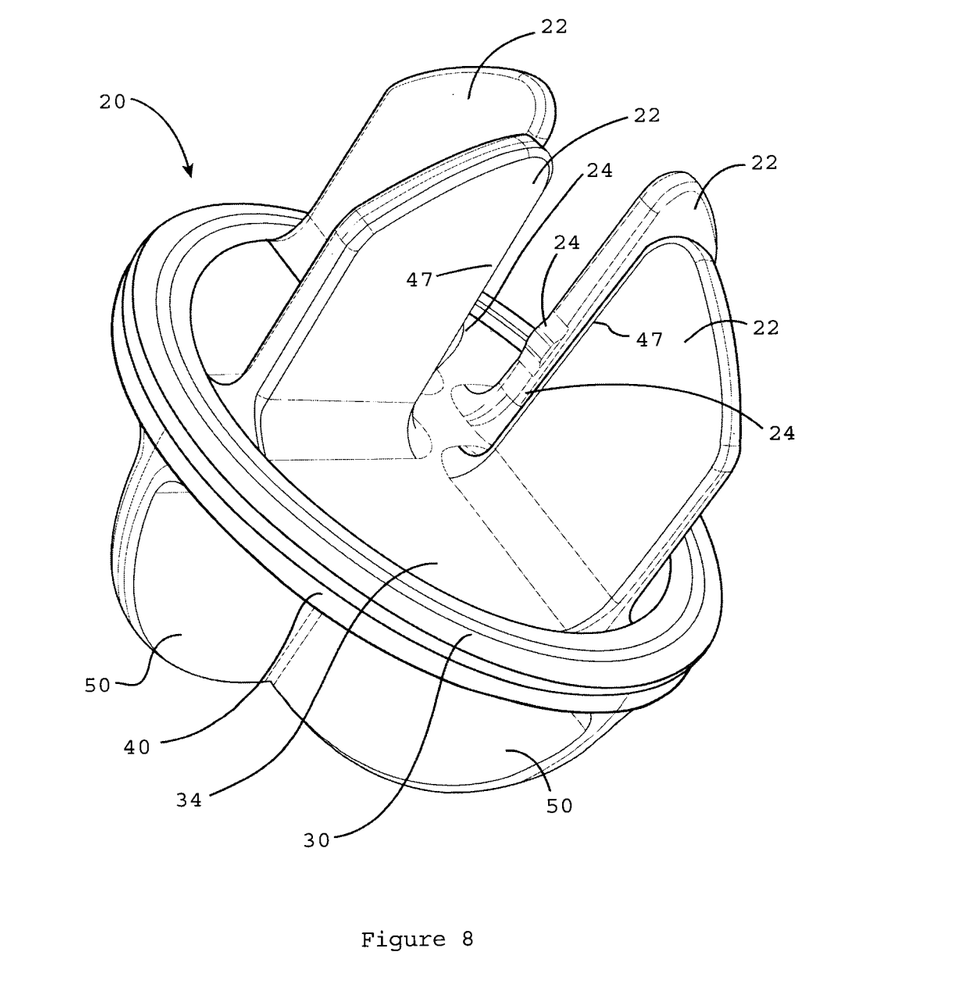
FIG. 8 is a perspective view of the releasable base.

As shown in FIGS. 6, 7 and 8, the releasable bottom member 20 comprises a planar body member 34 which is sized to cover the open bottom of storage compartment 18 when the bottom member 20 is coupled to the compartment 18. Extending radially outwardly from the planar body member 34 is an annular ring 40. This annular ring provides a support surface for the sealing ring 30. When the releasable bottom member 20 is closing the storage compartment 18, the sealing ring 30 is compressed between the annular ring 40 of the bottom member 20 and the rim 32 of the storage compartment 18. A plurality of the upper mixing vanes 22 extend upwardly from planar body member 34 and preferably extend across from the outer edge of the planar body 34 adjacent the annular ring 40 to a location short of the center of the planar body 34. This creates a central space 46 that receives and latches with a center post 26 of the compartment. Each upper mixing vane 22 includes an engagement ridge 24 on the inside edge 47 of each of the upper mixing vanes 22.

The bottom member 20 further includes a plurality of lower mixing vanes 50. Each lower mixing vane 50 extends downwardly from the planar body 34 towards the lower containment vessel 2. In a preferred embodiment each vane is a quarter circle in shape and extends from one edge of the planar body to the center of the planar body. Together, the upper mixing vanes 22, the planar body 34 and lower mixing vanes 50 collectively form a generally spherical shape. However, any shape that helps promote agitation and mixing when the bottom member is released and the bottle is shaken would be effective. These vanes could be ported vanes if preferred.

Figure 9:
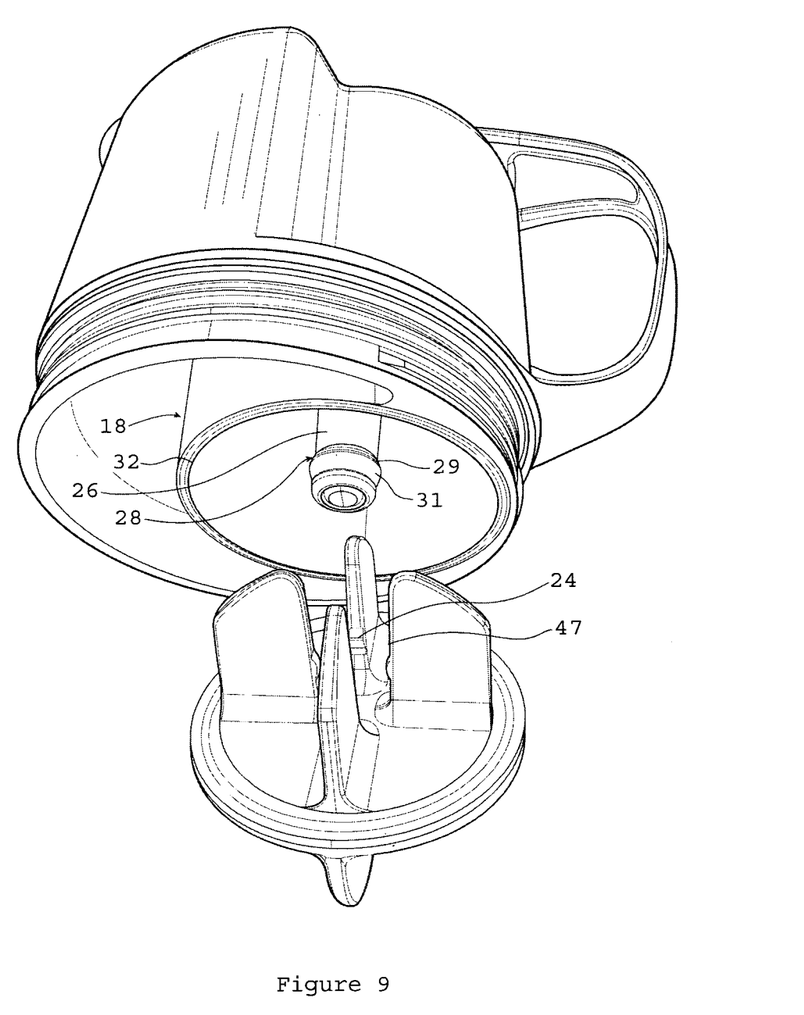
FIG. 9 is a perspective view of the releasable base and the upper components of the lid assembly.
Figure 10:
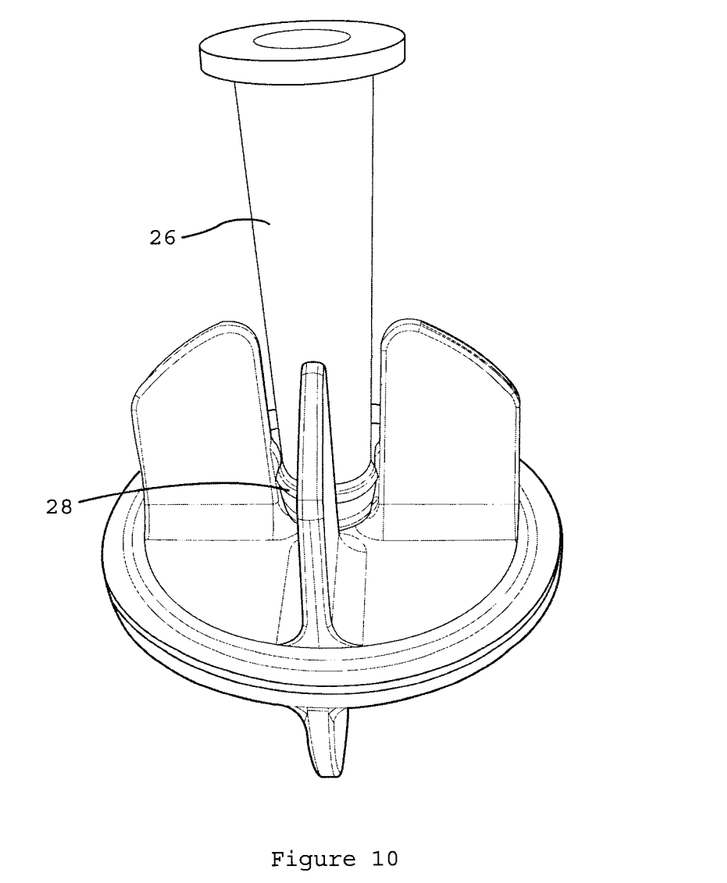
FIG. 10 is a perspective view of the releasable base coupled to a center post forming part of a release actuator.

As shown in FIGS. 9 and 10, the compartment 18 comprises a center post 26 having an engagement ring 28 which cooperates with the engagement ridges 24 to releasably secure the bottom member 20 to the compartment 18. The engagement ring 28 protrudes outwardly from the center post 26 near the free end of the post.

To couple the bottom member 20 to the compartment 18, the upper mixing vanes 22 are aligned with the center post 26 of the chamber and inserted thereon. The engagement ridges 24 of the upper mixing vanes initially contact angled cam face 31 of the engagement ring 28. The upper vanes deflect allowing engagement ridges to pass over engagement ring 28 and engage the latch surface 29 on the back side of the retaining ring 28. The latch surface 29 of the engagement ring 28 cooperates with the engagement ridges 24 and returns the bottom member secured on the center post 26. In this position, the sealing ring 30 is preferably compressed between the rim of the compartment 32 and the annular ring 40 of the bottom member 20 to provide a liquid-tight seal between the storage compartment 18 and the bottom member 20.

When the releasable bottom member 20 is held on the center post 26, the upper mixing vanes 22 are positioned within the compartment 18. With the bottom member 20 retained on the center post 26, the user can fill the lower vessel with a liquid, such as water, and maintain the separation between a powdered supplement within the storage compartment 18 and the liquid in the lower containment vessel 18. This allows the shaker bottle 1 to be used as a typical water bottle until the user is ready to release the powdered supplement.

The bottom member 20 is released by depressing a spring biased piston 36 provided within the hollow center post 26 of the compartment 18. The piston 36 includes an actuator button 37 which preferably is recessed in the surface of the lid to prevent accidental activation of the piston 36. Upon depressing the actuator button 37, the piston 36 is moved downward through and slightly beyond the center post. The tip 56 of the piston 36 extends through the opening 54 of the center post 26 and strikes and moves the planar body 34. This provides the necessary force and movement to force the engagement ridges 24 to move over the engagement ring 28 releasing the bottom member 20 from the center post. As the bottom member 20 forms the lower surface of compartment 18, the release of the bottom member 20 allows the contents of the compartment 18 and the bottom member to fall into the lower vessel.

When released from the compartment 18, the bottom member 20 acts as an agitator and mixer to aid in dissolving or suspending the powder within the liquid contained in the lower vessel. The user can rapidly shake the shaker bottle to assist in dissolving/suspending the supplement in the liquid, while the upper mixing vanes 22 and lower mixing vanes 50 provide increased agitation and mixing of the powdered supplement in the liquid. Any remaining powder in the storage compartment is open to the lower containment vessel and the liquid contents thereof.

The lid assembly 4 and the storage compartment 18 are designed to avoid locations where powder can become lodged. A rear side 62 of the lid assembly 4 forms part of the wall of the storage compartment 18, as shown in FIG. 1. The front side 60 of the lid assembly maintains a circular shape (larger in size relative to the storage compartment) consistent with the shape of the bottom vessel 2. The rear side 62 includes two inwardly extending wall portions 64 joining the storage compartment to the front portion of the lid assembly. The inwardly extending wall portions 64 are joined by a semi-circular wall 66 which as mentioned above, conforms to the shape of the storage chamber 18.

As shown in FIG. 2, this configuration of the lid assembly reduces the interior space to the rear of the storage compartment and avoids narrow passages between the exterior of the storage compartment and the interior wall of the lid where powdered supplement could accumulate. This lid assembly is convenient to clean and reduces the material required to mold the components. Basically the storage compartment is spaced to one side of the spout and tipping of the shaker bottle to dispense liquid through the port 12 positions the open storage compartment 18 at a raised position relative to the port. As shown in FIG. 4, liquid during tipping of the bottle enters the liquid passage inlet 11 which is to a lower side of the storage compartment 18 and designed to direct liquid to the port 12 (as opposed to into the storage compartment 18) when the bottle is tipped. This arrangement is particularly effective as the volume of liquid available for dispensing is reduced. Note the crescent type shape of the channel 11 that is to one side of the storage compartment.

The actuator button 37 is preferably centered on the storage compartment on the exterior of the bottle. The exterior actuation mechanism is advantageous in that the user does not need to open the bottle or touch any of the bottle contents to release the supplement. The actuator button 37 is spaced from the port 12 a sufficient distance to avoid user contamination therebetween.

This separation of components allows a user to drink from the port 12 and their mouth would not come in contact with the actuator button 37. Since the actuator button is activated by hand, this orientation reduces the chances of germs on the actuator button from the user's hand passing to the user's mouth. The spacing between the port 12 and the actuator button 37 is preferably at least 1 cm, however, a spacing of about 3 cm is effective.

There are two ways to fill the bottle; by removing the lid assembly and filling the lower containment vessel 2 or by filling the bottle through the port 12. With both methods, the seal between the storage compartment 18 and the releasable bottom member 20 is not directly exposed to fluid pressure as liquid is added. With filling through the spout the storage compartment wall will deflect the liquid downwardly and protects the sealed compartment. This arrangement protects the contents of the storage compartment from high pressure liquid that may occur during filling.

The actuator button can also include a resilient sealing arrangement in the lid assembly covering between the edges of the actuator button 37 or cooperating therewith to avoid liquid contamination. A removable cover for the actuator button could also be used to prevent any liquid from entering the space around the actuator button and draining through the center post 26 and into the storage compartment 18. A further or alternate sealing arrangement can be provided between the piston 36 and the hollow center post. In one embodiment, the sealing arrangement is a deformable material covering the opening 54 of the center post 26. This deformable material allows the tip 56 or the piston 36 to move beyond the opening 54 to release the releasable bottom member 20 while maintaining the seal. This sealing arrangement prevents any liquid from entering the storage compartment from the exterior of the bottle and prevents any contents of the storage compartment from entering the hollow center post 26.

The lid assembly 4 can be manufactured in any suitable manner, however, a multi-part assembly is preferred. The body 44 of the lid assembly 4 is preferably molded using a hard plastic material. This can be one piece structure or the center post 26 may be molded separately and fixed to the body 44 in any suitable manner. The cover 42 is overmolded onto the hard plastic body 44. Preferably, the cover 42 is a softer plastic, rubber or rubber-like material, such as a thermoplastic elastomer. If such a soft material is used for the cover 42, the need for an O-ring between the lower vessel 2 and the lid 4 may be eliminated. This is advantageous as a separate O-ring could be lost or prone to damage.

The invention should not be limited by the preferred embodiments set forth in the detailed description, but should be given the broadest interpretation consistent with the description as a whole and as defined in the appended claims.

The embodiment of the invention in which an exclusive property or privilege is claimed are defined as follows:

1. A shaker bottle comprising
an open top lower vessel for retaining a liquid volume; and
an upper member releasably engaging and closing said open top lower vessel;
said upper member including a liquid passage inlet in a bottom surface thereof connected to a closable port on an exterior of said upper member allowing liquid in said lower vessel to pass through said inlet and said closable port when said closable port is open and said upper member is closing said lower vessel;
said upper member including a storage chamber suitable for receiving a powder supplement; said storage chamber including a releasable bottom member forming a seal with said storage chamber separating said storage chamber from said lower vessel when said releasable bottom member is engaged with said storage chamber; said bottom member when released from said storage chamber being received in said lower vessel with said storage chamber being open to said lower vessel;
including a releasable actuator for said releasable bottom member; said releasable actuator being accessible on an exterior surface of said upper member; and
wherein said bottom member is shaped to promote mixing when released and received in said lower vessel; and
wherein said bottom member includes upwardly projecting mixing vanes positioned within said storage chamber when said bottom member is in engagement with said storage chamber.

2. A shaker bottle as claimed in claim 1, wherein said bottom member includes downwardly projecting mixing vanes.

3. A shaker bottle as claimed in claim 2 wherein said storage chamber includes a circular bottom peripheral edge for engagement with said bottom member, and said upwardly and downwardly projecting mixing vanes are curved to collectively form part of a sphere.

4. A shaker bottle comprising
an open top lower vessel for retaining a liquid volume; and
an upper member releasably engaging and closing said open top lower vessel;
said upper member including a liquid passage inlet in a bottom surface thereof connected to a closable port on an exterior of said upper member allowing liquid in said lower vessel to pass through said inlet and said closable port when said closable port is open and said upper member is closing said lower vessel;
said upper member including a storage chamber suitable for receiving a powder supplement; said storage chamber including a releasable bottom member forming a seal with said storage chamber separating said storage chamber from said lower vessel when said releasable bottom member is engaged with said storage chamber; said bottom member when released from said storage chamber being received in said lower vessel with said storage chamber being open to said lower vessel;
including a releasable actuator for said releasable bottom member; said releasable actuator being accessible on an exterior surface of said upper member; and
wherein said releasable actuator is a spring biased actuator having spring fingers engaging and retaining a retaining flange of said bottom member, said spring biased actuator when actuated moving said spring fingers from engagement from said bottom member and allowing release of said bottom member.

5. A shaker bottle as claimed in claim 4 wherein said spring biased actuator is a push actuator, said push actuator when pressed moving said spring fingers and displacing said bottom member to assist the release thereof.

6. A shaker bottle as claimed in claim 5 wherein said push actuator extends downwardly through said storage chamber and terminates within said storage chamber.

7. A shaker bottle as claimed in claim 6 wherein said retaining flange is upwardly offset and located above a midpoint of said bottom member when in engagement with said storage chamber.

8. A shaker bottle as claimed in claim 7 wherein said storage chamber is closed at an upper portion and includes a downwardly extending tube passing through and sealed with said storage chamber with an open end within said storage chamber; and wherein said actuator passes through said downwardly extending tube.

9. A shaker bottle as claimed in claim 8 including a plug for releasable sealing of said outlet port, said plug being retained on a strap secured to said upper member.

* * * * *